US010831168B2

(12) United States Patent
Iannello et al.

(10) Patent No.: US 10,831,168 B2
(45) Date of Patent: Nov. 10, 2020

(54) PORTABLE DEVICE AND METHOD FOR PRODUCTION CONTROL AND QUALITY CONTROL

(71) Applicants: Paul A. Iannello, Springfield, TN (US); Richard J. Iannello, La Canada, CA (US); Delano C. Stevens, Franklin, TN (US); Jarvis J. Stubblefield, Hendersonville, TN (US)

(72) Inventors: Paul A. Iannello, Springfield, TN (US); Richard J. Iannello, La Canada, CA (US); Delano C. Stevens, Franklin, TN (US); Jarvis J. Stubblefield, Hendersonville, TN (US)

(73) Assignee: Torq-Comm International Inc., Greenbrier, TN (US)

(*) Notice: Subject to any disclaimer, the term of this patent is extended or adjusted under 35 U.S.C. 154(b) by 19 days.

(21) Appl. No.: 14/872,363

(22) Filed: Oct. 1, 2015

(65) Prior Publication Data
US 2016/0098029 A1    Apr. 7, 2016

Related U.S. Application Data

(60) Provisional application No. 62/059,005, filed on Oct. 2, 2014.

(51) Int. Cl.
*G05B 19/042*   (2006.01)
*G05B 19/418*   (2006.01)
*H04L 29/08*    (2006.01)

(52) U.S. Cl.
CPC ... *G05B 19/0428* (2013.01); *G05B 19/41875* (2013.01); *H04L 67/32* (2013.01); *G05B 2219/32368* (2013.01); *Y02P 90/02* (2015.11)

(58) Field of Classification Search
CPC ........... G05B 23/0216; G05B 23/0267; G05B 23/23067; G05B 2219/32002;
(Continued)

(56) References Cited

U.S. PATENT DOCUMENTS 6,393,380 B1 * 5/2002 Zemlo ................ G05B 19/4185
702/182
6,904,333 B2 * 6/2005 Morimura ............... B29C 45/76
340/539.11

(Continued)

FOREIGN PATENT DOCUMENTS

CN   102666024 A   9/2012
JP   H09108999 A   4/1997
(Continued)

OTHER PUBLICATIONS

United States Patent and Trademark Office, International Search Report issued in PCT/US2015/53507, dated Jan. 20, 2016, 2 pages.
(Continued)

*Primary Examiner* — Todd Aguilera
(74) *Attorney, Agent, or Firm* — Ivan Posey, Esq.

(57) ABSTRACT

A system and method is for production control, and comprises an electronic device, and one or more network connectors associated with the electronic device configured to connect to a server computer. The server computer contains a database of one or more work instructions that are downloadable to the electronic device through the network connector. The one or more work instructions are configured to provide operation instructions for one or more tools and the one or more network connectors are further configured to provide work instructions to the one or more tools.

11 Claims, 4 Drawing Sheets

(58) Field of Classification Search
CPC ........... G05B 2219/32008; G05B 2219/32128; G05B 2219/36133; G05B 23/0286–0294; G05B 2219/13171; G05B 2219/15045; G05B 2219/25167; G05B 2219/23406; G05B 2219/32368; G05B 2219/36159; G05B 2219/37095; G05B 19/428; G05B 19/41875; G05B 2219/23297; G05B 2219/23304; G05B 2219/23328; G05B 2219/23329; G05B 2219/23431; H05L 67/32; Y02P 90/18; Y02P 90/22; Y02P 90/26; H04L 67/32
USPC .............................................. 700/2, 83, 109
See application file for complete search history.

(56) References Cited

U.S. PATENT DOCUMENTS

| | | | | |
|---|---|---|---|---|
| 7,551,628 | B2* | 6/2009 | Holder | ................ H04L 63/0492 370/401 |
| 2002/0184568 | A1 | 12/2002 | Kurrasch | |
| 2003/0061384 | A1 | 3/2003 | Nakatani | |
| 2003/0206542 | A1* | 11/2003 | Holder | ................ H04L 63/0492 370/338 |
| 2004/0044434 | A1* | 3/2004 | Morimura | ............... B29C 45/76 700/197 |
| 2005/0223856 | A1 | 10/2005 | Reynertson et al. | |
| 2007/0299800 | A1* | 12/2007 | Bayoumi | ........... G05B 19/4185 706/47 |
| 2012/0283864 | A1* | 11/2012 | Dogan | ............... B22D 11/0622 700/106 |
| 2015/0328838 | A1* | 11/2015 | Erb | .................... B29C 67/0088 700/119 |
| 2015/0370243 | A1 | 12/2015 | Fukatsu | |
| 2016/0054721 | A1* | 2/2016 | Oberg | ...................... B25F 5/00 700/168 |

FOREIGN PATENT DOCUMENTS

| | | |
|---|---|---|
| JP | 5512051 B1 | 6/2014 |
| TW | 487956 B | 5/2002 |
| TW | I344619 B | 7/2011 |
| TW | 454871 B | 10/2014 |
| WO | 2006/052459 A1 | 5/2006 |

OTHER PUBLICATIONS

United States Patent and Trademark Office, Written Opinion issued in PCT/US2015/53507, dated Jan. 20, 2016, 7 pages.
European Patent Office, 15846356.2, May 11, 2018, Extended European Search Report.
Taiwan Patent Office, First Offie Action, dated Oct. 1, 2018.
Chinese Patent Office, First Office Action, dated Mar. 26, 2020.

* cited by examiner

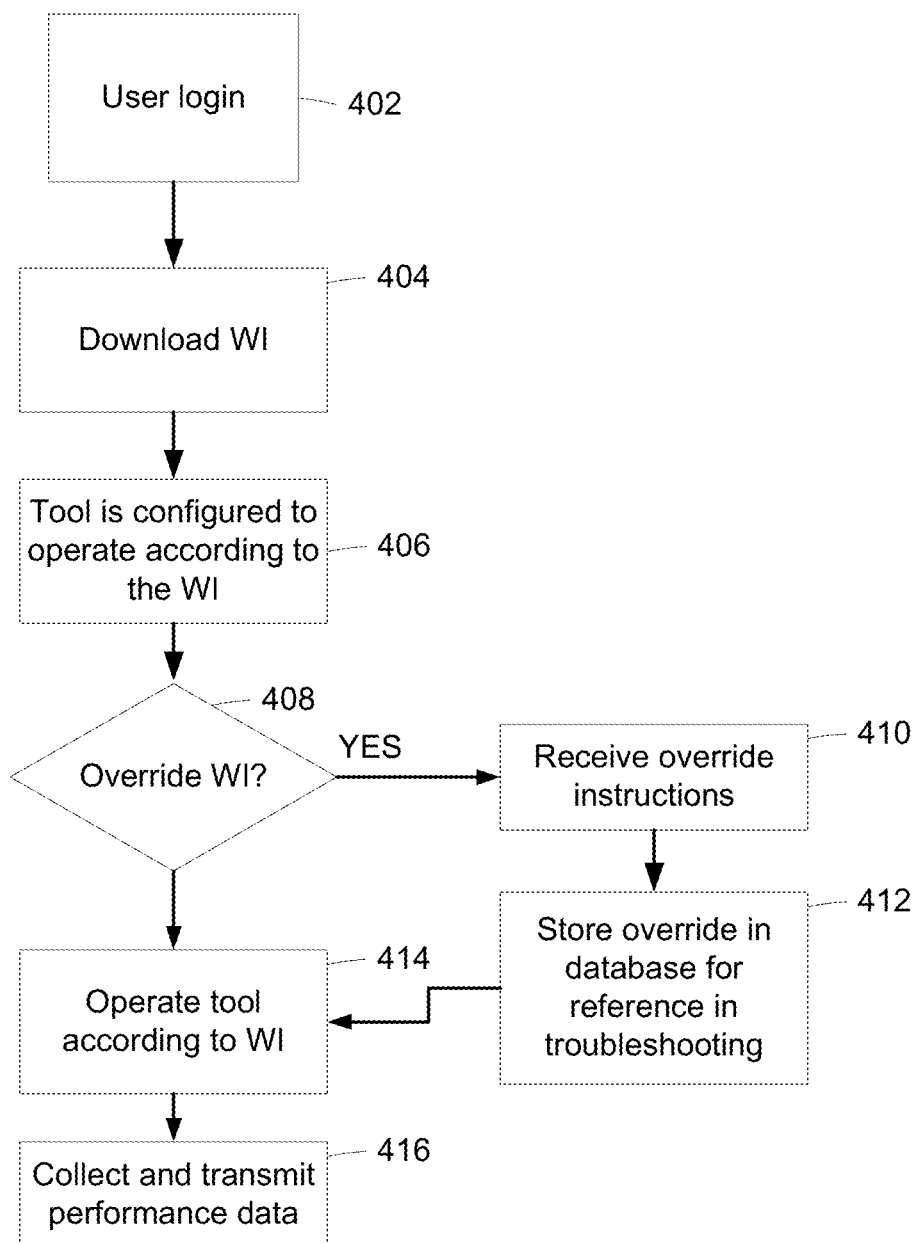

PORTABLE DEVICE AND METHOD FOR PRODUCTION CONTROL AND QUALITY CONTROL

RELATED APPLICATION INFORMATION

This application claims priority from Provisional Patent Application Ser. No. 62/059,005, entitled "Portable Device And Method For Production Control And Quality Control", filed Oct. 2, 2014, the contents of which are hereby incorporated by inference in its entirety.

FIELD OF THE INVENTION

The invention relates to a portable device and method for production control and quality control. Specifically, the system and method provides a portable device and method for production control and quality control, giving the operator up to date work instructions and for collecting results data from industrial tools.

SUMMARY OF THE INVENTION

In accord with a preferred embodiment of the invention, a system for production control comprises: a portable electronic device; one or more network connectors associated with the portable device configured to connect to a server computer, the server computer containing a database of one or more work instructions that are downloadable to the portable electronic device through the one or more network connectors, the one or more work instructions configured to provide operation instructions for one or more tools; and the one or more network connectors further configured to provide work instructions to the one or more tools.

In accord with another preferred embodiment of the invention, a method for production control comprises: connecting a portable electronic device to a server computer using one or more network connectors associated with the portable device, the server computer containing a database of one or more work instructions that are downloadable to the portable electronic device through the one or more network connectors; and according to the one or more work instructions, providing operation instructions for one or more tools.

BRIEF DESCRIPTION OF THE DRAWINGS

FIG. 4 is a flow diagram describing steps executed by the software program and client application according to the embodiment of FIGS. 2 and 3.

DETAILED DESCRIPTION OF THE PREFERRED EMBODIMENTS

For the purpose of illustrating the invention, there is shown in the accompanying drawings several embodiments of the invention. However, it should be understood by those of ordinary skill in the art that the invention is not limited to the precise arrangements and instrumentalities shown therein and described below.

Figure 1:
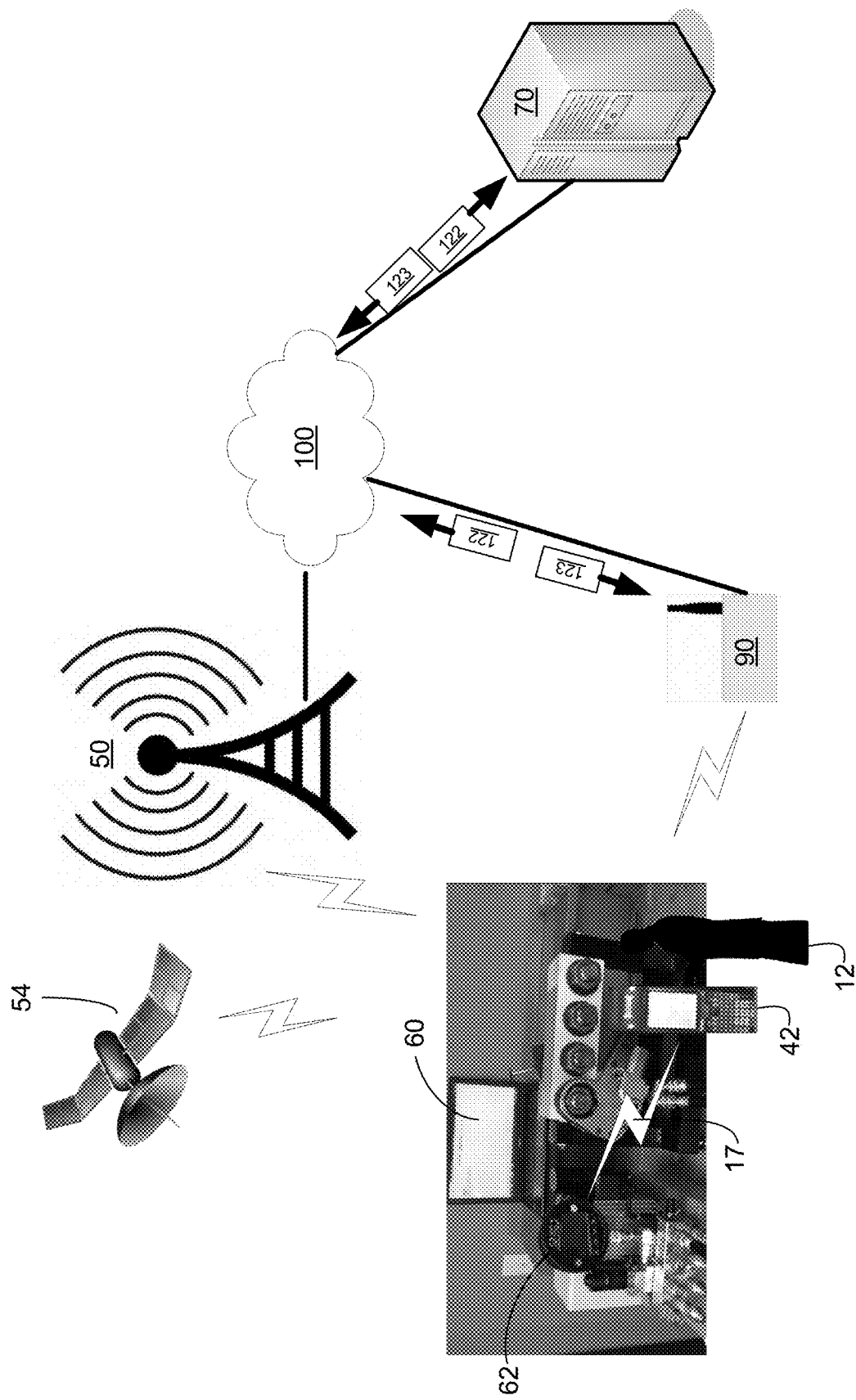
FIG. 1 is a diagrammatic overview of network platform that may be used in one embodiment of a production control and quality control system.

With reference to FIG. 1, a diagrammatic overview of network platform that may be used in one embodiment of a portable device and method for production control and quality control. In one embodiment, a server computer 70 may comprise one or more complex instruction set computers (CISCs) or one or more reduced instruction set computers (RISCs). The server 70 may comprise a network connector that connects the server computer to a wide area network (WAN) 100. The WAN may comprise, for example, a virtual private network over the Internet.

In one embodiment, the Internet 100 may thus provide for secure connections with the server computer 70 to electronic devices connected to the Internet 100. The connection can best be covered under the umbrella of the Internet of Things (IoT). Said devices may include, by way of example and not by way of limitation, one or more personal mobile electronic devices 42 connected to Internet 100 via Wi-Fi or a cellular network 50, which may comprise a digital 2G, 3G, 4G, WMAX, near field communication (NFC), light emitting diode (LED), or other cellular network 50. A satellite network 54 may also or alternatively be used to connect with the server computer 70. In this regard, each personal mobile electronic device 42 may include, by way of example and not by way of limitation, a personal mobile communicator or cellular phone, smart phone, tablet, two-in-one, or any personal digital communicator.

In addition, in one embodiment, the mobile devices 42 may alternatively communicate with the Internet 100 via cellular towers 50 located in the cellular network. In the case of a mobile device 42 that may comprise a satellite enabled device, such as a satellite phone, communication with the Internet 100 may occur via a satellite 54.

However, in one embodiment, one or more of the devices 42 may include the TEKFLEX TF300i, TF200 or TF100 hand held device currently available from I and R Partners, Inc. of Madison, Tenn. In one embodiment, the TekFlex hand held device is able to connect to an industrial tool (62 in FIG. 1) through a BLUETOOTH interface 17.

The handheld device 42 may thus provide the operator downloaded up to date work instructions 123. Further, the handheld device 42 may collect results data from the industrial tool 62. Further, the handheld device 42 also may control the industrial tool 62. The downloaded work instructions 123 may also include settings for the tool 62. Also, the work instructions may include 123 sequences for testing the industrial tool 62, and collecting results data, which may all be done through the handheld device 42.

Any of the above-described devices or tools may be Wi-Fi and/or BLUETOOTH enabled with a Wi-Fi, 4G, 3G, wireless, near field communication (NFC) and/or BLUETOOTH radio transceiver installed or integrated into the device as recognized by those of skill in the art. In this regard, a Wi-Fi hub 90 may optionally be used with any of such wireless-enabled devices to connected and communicate data 122, 123 over the Internet 100.

Further connected to the network may be one or more personal computing devices 60. Each personal computing device 60 may comprise, by way of example, a personal computer, a notebook computer, a tablet, a laptop computer, smart television (smart TV), Roku® device, or the like.

Figure 2:
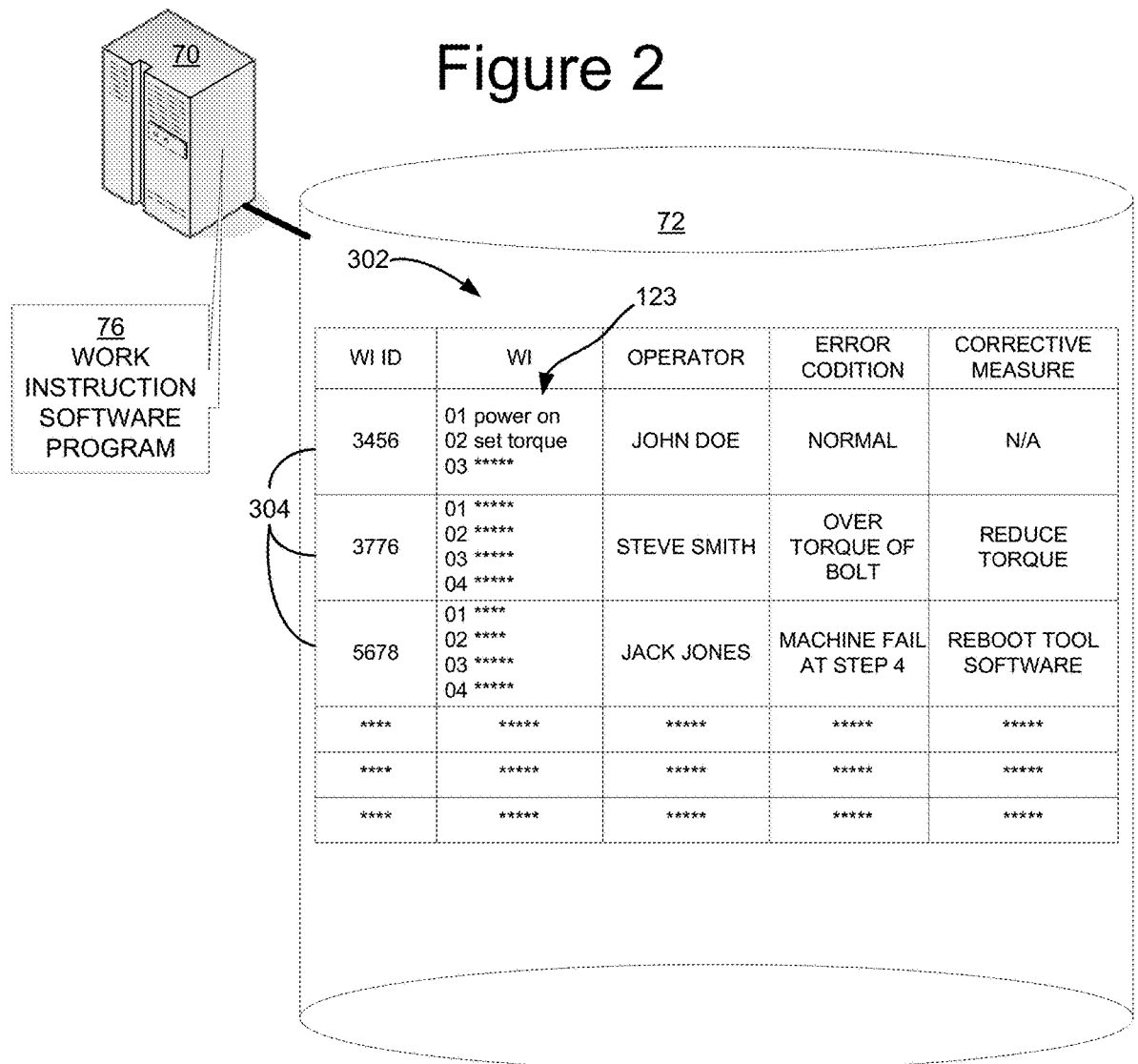
FIG. 2 is a diagram illustrating selected components of the server of the embodiment of FIG. 1.

With reference to FIG. 2, a diagram illustrating selected components of the server 70 of the embodiment of FIG. 1 is shown. In one embodiment, the server 70 may comprise one or more sets of computer instructions, or software, that may comprise an on-call software program 76. Server 70 may further comprise one or more storage devices 72 for storing one or more databases 302. The database may include records 304 associated with work instructions 123 for industrial tools 62. Each set of work instructions (WI) may be stored in one or more WI fields in each record 304 of the database 302.

In the embodiment of FIG. 2, each database record 304 may be indexed by a work instruction ID. The work instruction ID may be tied to the type of tool 62, and the job to be performed by the tool 62 and the operator 12. Optionally, operator names may be stored in the database records. Further, an error condition field may store whether there was an error in the operation of the tool 62. The error condition may store more granular information, such as the type of error condition (e.g., normal, over torque, tool operation error, etc.), operator, and procedure in which the error occurred. Finally, corrective measures that may be applied to the tool 62 through the device 42 may be stored, thus providing a feedback mechanism to correct the errors for the tool 62. The device 42 may contain, for example a keyboard input, on screen keyboard input, voice recognition software, touch screen, or any other types of input devices known to those skilled in the art capable of receiving input from an operator to define the error and/or to suggest corrective measures.

Figure 3:
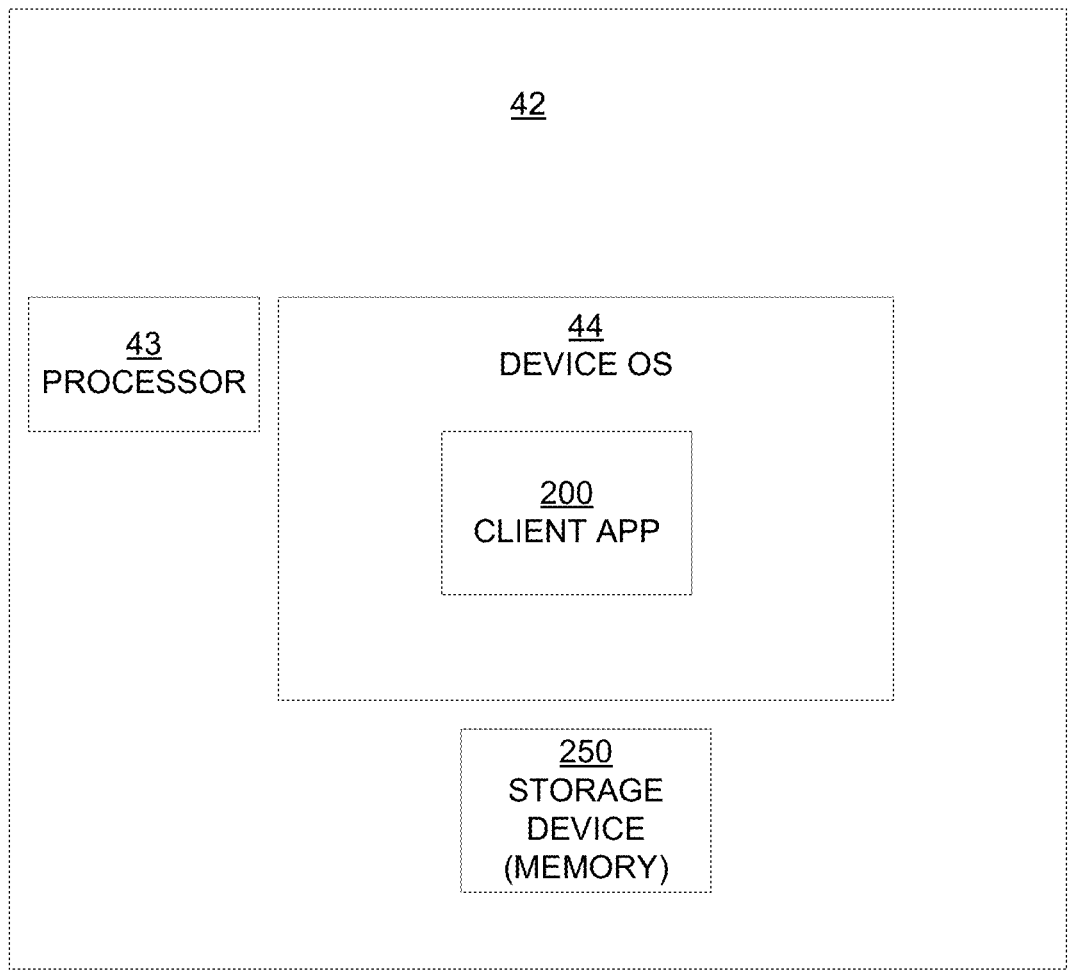
FIG. 3 is a diagram illustrating selected components of one or more of the electronic devices according to the embodiment of FIG. 1.

With reference to FIG. 3, selected components of one or more of the portable devices 42 are shown according to the embodiment of FIG. 1. In one embodiment, devices 42 may have differing operation systems, and other hardware components, the devices 42 typically have certain common features. While some form of the components of FIG. 3 typically may exist in all the different types of devices 42 of FIG. 1, the universal components will be described with respect to devices 42 in FIG. 3, with those skilled in the art recognizing that these components may be in common with all types of devices 42 referenced and described above with respect to FIG. 1. By way of example, and not by way of limitation, device 42 may include a processor 43 44, and an operating system 44 configured to execute on the processor. A memory storage device 250 may further be included to store both application code for applications, and application data. One of those applications may comprise a client portion of the client application 200 that executes on devices 42. Of course, the operation, look and feel of the client application 200 may or may not have a different configuration depending on whether the device 42 is a smart phone, tablet, or computer 60, TEKFLEX TF300i/TF200/TF100, or other type of device.

With reference to FIG. 4, a flow diagram describing steps executed by the software program 76 and client application 200 according to the embodiment of FIGS. 2 and 3 is shown. It should be recognized by those of skill in the art that some steps may be performed by the client application 200 locally, and the server application 76, depending on sharing of resources, communication bandwidth, and other factors for application efficiency. The steps will be described with this understanding.

In step 402, the user (12 in FIG. 1) may login with their user name and password on the portable device 42, whereby the database record for the particular work instruction 123 is updated to reflect the user 12 that is operating the tool 62. In step 404, the portable device 404 may interface with the server 72 to receive and update work instructions (WI) 123 on the portable device 62, which may include, for example assembly schedules or operation limits of the tool, such as upper and lower control limits. For example, the server may download both instructions for the user 12 and instructions to the tool 62. In step 406, the tool may then automatically be configured to operate according to the WI 123. For example, a compressor might be configured to provide a certain amount of torque to an air-wrench so the operator can use the air wrench to tighten lug nuts, or the like. Normally, the compressors' pressure is controlled by a dial or knob that is turned to adjust the holding tank's pressure. In embodiment, instead, a servo controlled actuator may be used to turn the shaft of the knob. The servo motor is powered by the compressor and a small receiver and circuit may control the stepper. This embodiment may be easily retrofittable to existing pumps in the field. In another embodiment, the pressure may be controlled by incorporation of a soft-switch that is incorporated within the compressor housing. The WI provides instructions to both the user and the tool to complete the task.

In step 408, in one embodiment, the operator has an option to override the WI 123 with procedures developed through the portable device 42. For example, pressure settings from a tool 62 comprising a hydraulic/pneumatic pump may be set through the device 42 comprising a TEKFLEX TF300i/TF200/TF100 to control a servo actuator. If so, then in step 410, the portable device may be used to receive modifications to the WI 123. However, to keep integrity within the error checking method of the system, the portable device may send the modified instructions back to the server 72 to be stored in the records 304 of the database 302 in case the modified instructions do cause error in operation of the tool 62, step 412. Those modified instructions may also including instructions that make sure the operator is operating the tool within specifications.

In step 414, the tool 62 is operated by the portable device 42 according to the WI 123. during operation, performance data during operation of the tool 62 may be collected by the portable device 42 and transmitted to the server 76 for storage in records 304 of database 302, and transmitted to other computer devices 60 for analysis, performance graph plotting, or other measurements on screen in real time.

In summary, the handheld device 42 may control tools 62 remotely either through a cable or wirelessly for production control/quality control while interfacing through a cloud server 72. The software 76, 200 of the system transforms and records the data values in records 304 for the industrial tools 62 (torque, size, etc.) and sends them to the cloud server 72 where remote supervisors can review, audit and control work. Those production values can be verified by the quality software 76. In embodiment, the quality control data can be transmitted or received to and from any measurement device that has a digital output. Transmission to the measurement device may be via wired or wireless channels by attaching a transceiver to the device. In this way, similar quality control data may be collected from the apparatus under construction directly, for example, from the unit on which lug nuts are being tightened. For example, very large pipe sections, like those for wind turbines, have a tightening spec for the nuts on the flange but also a leveling specification for the flange itself in order to keep the mono-pole as straight as possible. The leveling is checked by laser, caliper, etc. Data may be collected and stored with the production data to fully qualify an assembly job.

The various embodiments described above are provided by way of illustration only, and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A system for wireless control of a tool, comprising:
a tool that is controllable by an electronic device according to one or more work instructions;
the electronic device;
one or more wireless connectors associated with the electronic device configured to connect to the tool and a server computer containing a database of one or more work instructions that are downloadable to the electronic device through the one or more wireless connectors, the one or more work instructions configured to provide operation instructions for the tool; and
the one or more wireless connectors further configured to receive one or more error condition indicators and to provide one or more correction work instructions to the tool;
wherein the one or more work instructions are updatable;
wherein the electronic device further comprises an input device;
wherein the input device is configured to receive input from an operator of the electronic device regarding operational errors experienced during operation of the tool;
wherein the received input comprises feedback that is used for updating the one or more work instructions to produce updated work instructions to eliminate the operational errors;
wherein the one or more wireless connectors are configured to transmit the feedback to the server computer for updating the database with the updated work instructions for use in eliminating operation errors experienced during operation of one or more other tools to which the updated work instructions may be downloaded from the database;
wherein the database comprises records associated with the one or more work instructions and the updated instructions that are stored in one or more fields in each record;
wherein each database record is indexed by a work instruction ID,
wherein the work instruction ID is related to a type of tool and a job to be performed by the tool and the operator;
wherein each record further comprises an error condition field that stores whether there was an error in the operation of the tool;
wherein the error condition field further stores a type of error condition, an operator, and procedure in which the error occurred;
wherein each record further stores a corrective measures field that stores applicable corrective measures.

2. The system of claim 1, wherein the work instructions include instructions to make sure that the operator of the tool operates the torque wrench through the electronic device within specifications.

3. A system for production control, comprising:
a torque wrench that is controllable by an electronic device according to a first one or more work instructions;
the electronic device;
one or more network connectors associated with the electronic device configured to connect to a server computer, the server computer containing a database of the first one or more work instructions that are downloadable to the electronic device through the one or more network connectors, the first one or more work instructions configured to provide operation instructions for the torque wrench; and
the one or more network connectors further configured to receive one or more error condition indicators and to provide one or more correction work instructions to the torque wrench;
wherein the first one or more work instructions are updatable;
wherein the electronic device further comprises an input device;
wherein the input device is configured to receive input from an operator of the electronic device regarding operational errors experienced during operation of the torque wrench;
wherein the received input comprises feedback that is used for updating the first one or more work instructions to produce updated work instructions to eliminate the operational errors;
wherein the one or more network connectors are configured to transmit the feedback to the server computer for updating the database with the updated work instructions for use in eliminating operation errors experienced during operation of one or more other torque wrenches to which the updated work instructions may be downloaded from the database;
wherein the database comprises records associated with the one or more work instructions and the updated instructions that are stored in one or more fields in each record;
wherein each database record is indexed by a work instruction ID,
wherein the work instruction ID is related to a type of tool and a job to be performed by a tool and the operator;
wherein each record further comprises an error condition field that stores whether there was an error in the operation of the tool;
wherein the error condition field further stores a type of error condition, an operator, and procedure in which the error occurred;
wherein each record further stores a corrective measures field that stores applicable corrective measures.

4. The system of claim 3, wherein the updated work instructions include correction of upper and lower control limits of the torque wrench.

5. The system of claim 3, wherein each of the one or more network connectors are of a type selected from the group consisting of: a wireless frequency interface (wifi), wireless interface, 2G, 3G, 4G, WMAX, near field communication (NFC), satellite, light emitting diode (LED) and BLUETOOTH.

6. The system of claim 3, wherein the electronic device is of a type selected from the group consisting of: a personal mobile communicator, cellular phone, smart phone, tablet, two-in-one device, personal computer, and personal digital communicator.

7. A method for quality control during use of an air wrench comprising:
connecting the air wrench that is controllable by an electronic device according to first one or more work instructions to the electronic device which is connected to a server computer using one or more network connectors associated with the electronic device, the server computer containing a database of the first one or more work instructions that are downloadable to the electronic device through the one or more network connectors; and according to the receiving one or more error condition indicators and providing one or more correction work instructions, providing operation instructions for the air wrench;

wherein the first one or more work instructions are updatable;

wherein the electronic device further comprises an input device;

wherein the input device is configured to receive input from an operator of the electronic device regarding operational errors experienced during operation of the air wrench;

wherein the received input comprises feedback that is used for updating the first one or more work instructions to produce updated work instructions to eliminate the operational errors;

transmitting the feedback to the server computer for updating the database with the updated work instructions for use in eliminating operation errors experienced during operation of one or more other air wrenches to which the updated work instructions may be downloaded from the database;

wherein the database comprises records associated with the one or more work instructions and the updated instructions that are stored in one or more fields in each record;

wherein each database record is indexed by a work instruction ID, wherein the work instruction ID is related to a type of tool and a job to be performed by a tool and the operator;

wherein each record further comprises an error condition field that stores whether there was an error in the operation of the tool;

wherein the error condition field further stores a type of error condition, an operator, and procedure in which the error occurred;

wherein each record further stores a corrective measures field that stores applicable corrective measures.

8. The method of claim 7, wherein the one or more network connectors are configured to transmit the feedback to the server computer for updating the database with the updated work instructions.

9. The method of claim 8, wherein the updated work instructions includes correction of upper and lower control limits of the air wrench.

10. The method of claim 7, wherein each of the one or more network connectors are of a type selected from the group consisting of: a wireless frequency interface (wifi), wireless interface, 2G, 3G, 4G, WMAX, near field communication (NFC), light emitting diode (LED), satellite and Bluetooth BLUETOOTH.

11. The method of claim 7, wherein the electronic device is of a type selected from the group consisting of: a personal mobile communicator, cellular phone, smart phone, tablet, two-in-one device, personal computer, and personal digital communicator.

\* \* \* \* \*